(No Model.) 2 Sheets—Sheet 1.
R. S. PENNIMAN.
APPARATUS FOR THE FINAL CONCENTRATION OF OIL OF VITRIOL.
No. 469,439. Patented Feb. 23, 1892.
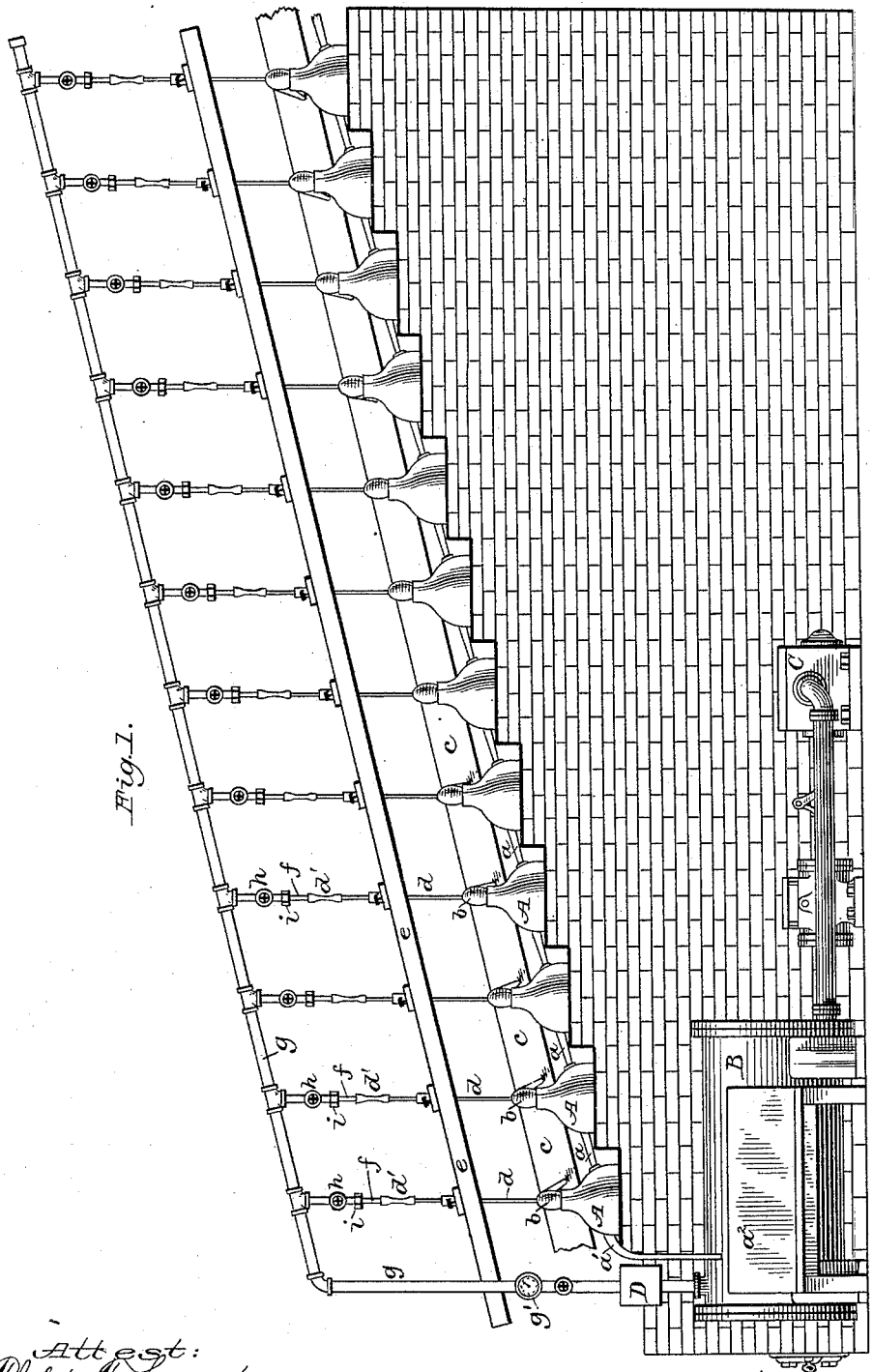

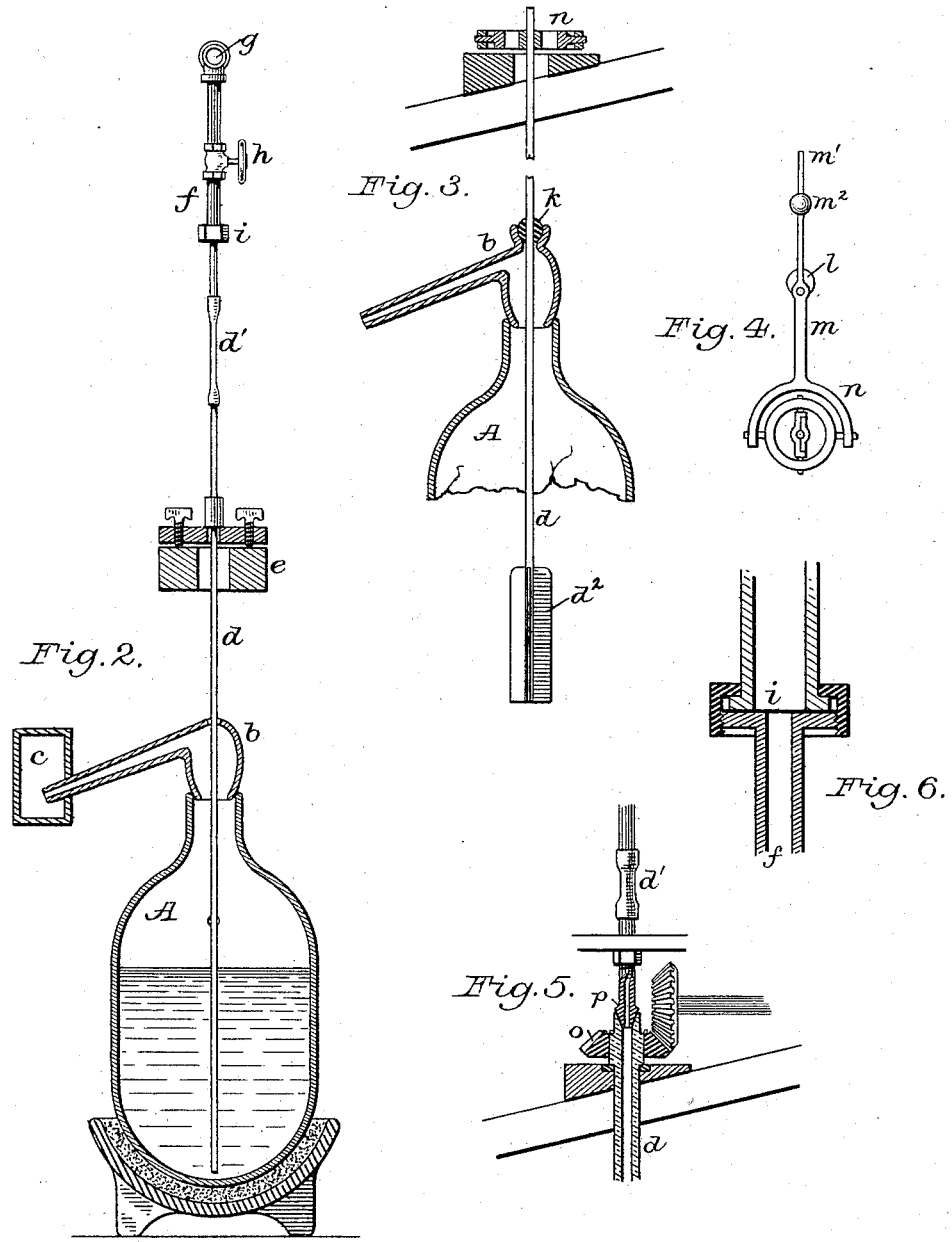

and of iron—according to circumstances, notably in the continuous process, wherein platinum retorts have been used for the lower concentrations co-operatively with iron retorts, which are relied upon for the high concentrations. In the concentration of all sulphuric acid, especially that derived from pyrites, it is well known that iron salts are deposited in the retorts, and these are capable of more or less corrosive and destructive effect upon the bottoms of the platinum retorts, and the same is true of such nitrogen acids as are liable to and frequently exist in acids to be concentrated. The use of iron retorts is more or less objectionable, because of the well-known adverse effect of the iron upon the product, rendering it unfit for some purposes. In both processes glass retorts have also been used, and notwithstanding their capacity to resist corrosion, and to assure the integrity of the product concentrated therein and the great economy involved in first cost, their liability to breakage, and the attendant waste in acid and time and labor, as well as danger to attendants, has largely precluded their use in favor of the metal retorts, especially in continuous-process apparatus, although single glass retorts are used to some extent under the intermittent process, as a choice between two evils, in avoiding the high cost of platinum retorts, and the deteriorating effect of iron on the product while encountering the greater cost in fuel and labor, as well as the liability to wastage and danger to attendants incident to breakage.# UNITED STATES PATENT OFFICE.

RUSSELL S. PENNIMAN, OF DOVER, NEW JERSEY, ASSIGNOR TO THE ATLANTIC DYNAMITE COMPANY, OF SAN FRANCISCO, CALIFORNIA.

APPARATUS FOR THE FINAL CONCENTRATION OF OIL OF VITRIOL.

SPECIFICATION forming part of Letters Patent No. 469,439, dated February 23, 1892.

Application filed March 15, 1886. Serial No. 195,313. (No model.)

*To all whom it may concern:*

Be it known that I, RUSSELL S. PENNIMAN, of Dover, in the county of Morris and State of New Jersey, have invented certain new and useful Improvements in Apparatus for the Final Concentration of Oil of Vitriol; and I do hereby declare that the following specification, taken in connection with the drawings furnished and forming a part of the same, is a clear, true, and complete description of the several features of my invention.

Introductory to a statement of my invention it should be understood that the final concentration of oil of vitriol has been heretofore practiced under processes properly termed the "intermittent" and the "continuous" processes—in other words, by the use of a single retort, which is alternately charged, operated, cooled, and emptied in the one case, and in the other by the use of a series of retorts coupled together in a descending grade, so that as weak acid is continuously supplied to the highest retort it gradually flows therefrom to the next, and so on, more or less concentration being effected in each retort down to the lowest, from which the concentrated product is continuously delivered.

The prime value of my improvements accrues in connection with said continuous process, it being the main object of my invention to secure all of its economic advantages in the use of fuel as well as attendance and capacity in production, and for the first time, as I believe, to obtain as complete results in the way of concentration as have been or can be obtained on a large scale by the intermittent process. In both processes retorts of various kinds have been employed—as, for instance, they have been composed of platinum It has been hereinbefore indicated that my prime object is to obtain all of the advantages incident to the continuous process, and I will now state that it further includes the obtaining of all the advantages incident to the use of glass retorts, all of which practically depend upon reducing the liability of their breakage to a minimum. It should next be understood that the results of said breakage in the intermittent process are trifling as compared with the breakage of a retort in a continuous-process apparatus, because breakage is less liable in the intermittent than in the continuous process and also because the one retort and its contents are alone involved in the one case, while in the continuous process the entire plant is crippled by the breakage of a single retort, and from, or as the result of one breakage, other adjacent retorts are also more or less liable to be broken. It should be further understood that the usual forms of breakage with the single glass retort under the intermittent process are so unlike the usual forms of breakage in retorts coupled for the continuous process as to clearly indicate widely-different causes. With the single retort the usual breakage is a smashing of the bottom, as a result of what is known as "bumping," caused by a sudden ebullition in mass of the contents of the retort under high temperatures. With the coupled retort in a continuous-process plant the usual breakage is on a peripheral line adjacent to the normal level of its contents, due probably to abrupt variations in expansion of the upper and lower portions of the retort incident to the gradual entry and discharge of acids, which are maintained at a non-variable level in each retort. With the coupled retort bumping seldom occurs, because of the comparatively low temperatures and the continuous flow of the acid; but even this contingency is reduced to a minimum, and in fact is practically obviated in my approved apparatus.

Now all of the desirable ends stated are attained by me, because I have, as I believe, for the first time combined with the coupled glass retorts in a continuous-process apparatus means for maintaining the contents of each in such a condition as to uniform temperature as to practically obviate breakage of the retorts; and I am also, so far as I know, the first to combine such means with a single glass retort used in the intermittent process for concentrating oil of vitriol. For thus equalizing the temperature of the contents of a glass retort I rely upon agitation, and this may be variously accomplished without departure from the main feature of my invention. Good results will accrue from the use of mechanically-operated stirring contrivances within the retort. Better results will accrue from the use of injected air operating mechanically as an agitating medium if the air be properly controlled and applied; but the best results will accrue from the use of a mechanically-driven stirrer in conjunction with injected air under proper conditions. The agitation of the contents of a series of glass retorts in a continuous-process apparatus as practiced by me is also of practical value, in that it results in preventing the undue deposit of salts in the retorts, as well as in the connecting-tubes, wherein obstruction is well known to be liable to occur as a result of such deposits.

Inasmuch as it appears from the aforesaid statement of the means for agitation relied upon by me that injected air under proper conditions is, when broadly considered, an equivalent for a mechanically constructed and operated stirring contrivance, it is believed to be proper to next refer to certain prior uses of injected air for enabling a better understanding of the status of my invention in the art of manufacturing sulphuric acid, and especially in that particular part thereof which embraces the final concentration of oil of vitriol, it being of course understood that the acids to be supplied to a concentrating plant are such as have been manufactured by methods which need only involve the use of such well-known apparatus as in no manner pertains to my invention.

In the manufacture of sulphuric acid open pans of lead or other metal have been employed, and into the contents of said pans air has been liberally injected; but it will be obvious that the results of said prior use of air are in no manner pertinent to the protection of glass retorts.

In the purification of sulphuric acid or oil of vitriol single glass retorts have been employed and air has been injected therein; but this process differs from the process of concentration, in that in said purification process the product sought is carried over from and out of the retort, while in the concentration process the product sought is retained in the retort. Moreover, in the purification process higher temperatures are involved than are usual in concentration. In the purifying process air was injected into said single retort solely for the purpose of facilitating the upward passage of vapors from the highly-heated portions of the surface of the retort, and thereby preventing bumping by obviating sudden ebullition in mass, and as equivalents of the injected air platinum scraps or wire, or bits of quartz, or of porcelain, or of hard coke have been placed in the retorts and successfully relied upon for so assembling and controlling the vapors evolved at the bottom of the retort as to prevent bumping. Now when it is considered that bumping is a remote contingency in a concentrating-retort, and that neither one nor all of said solid bodies heretofore introduced will serve my purposes, it should be obvious that the said prior use of injected air into a single glass retort used for purification is distinct and separate from the use of injected air by me as an agitating medium in a glass retort used for concentration, and especially in a series of glass retorts in an apparatus for concentration by the continuous process for the purpose of preventing the prevailing peripheral breakage. In the use of air as by me, however, the vapors eliminated within the retort are more readily discharged than when a mechanical stirrer is alone employed, and to this extent air injected into a concentrating-retort would serve the same purpose as when injected into a retort used for purification, and it is for that reason that I prefer injected air, whether as the sole or a co-operative means of agitation.

An apparatus embodying my invention in a desirable form has been extensively operated and tested by me with thoroughly satisfactory results, and said apparatus is illustrated in my drawings with such variations therein as will best illustrate the several features of my invention, all of which after a description of details will be duly specified in the several clauses of the claim hereunto annexed.

Referring to the two sheets of drawings, Figure 1 is a side elevation of my apparatus in a practically desirable form. Fig. 2 is a sectional view of a detached retort with its immediate coupling connections as organized when injected air is alone relied upon for agitation. Fig. 3 is a view similar to Fig. 2, illustrating a mechanical stirrer or agitator within a retort and in a form well adapted for use with or without injected air. Fig. 4 is a top or plan view of the mechanism for operating the stirrer shown in Fig. 3. Fig. 5 is a view similar to Fig. 2, illustrating a rotating mechanical stirrer, also adapted to be used with or without injected air. Fig. 6 is a portion of an air-injecting pipe in section for illustrating a perforated diaphragm as used by me.

In Fig. 1 neither the fire-box nor heating-flue is disclosed, and it is to be understood that any desired variations may be made therein without departure from the main feature of my invention. The uptake or chimney is not shown; but it is to be understood that ample draft for the furnace should be provided.

The glass retorts A are of a well-known form, and in the usual manner they are supported in sand baths within iron kettles. The number of retorts in an apparatus may be varied; but I prefer to employ twelve in each series, as shown, and I mount them in the masonry with relation to each other, so as to fairly economize space and allow a descending grade between each two of about six inches. As heretofore, each retort has pipe-holes on its upper and lower sides for enabling them to be coupled together, as shown, by means of the pipes $a$, which are preferably composed of glass, although other materials well known to be suitable may be employed. The lowest retort of the series discharges the concentrated product by way of pipe $a'$ into a suitable tank or cooler $a^2$. The neck of each retort is coupled by means of the usual alembic head $b$ to an inclined trunk or conduit $c$, communicating at its upper end with the same uptake or chimney which the retort-flue enters. The trunk $c$, as heretofore, receives the liquid products of condensation, which flow downward and are discharged from its lower end. Each alembic head above the neck of its retort is provided with an aperture large enough to loosely receive the glass tube $d$, which, as shown in Fig. 2, has a rubber collar and is suspended from a rail $e$, provided with holes, and each pipe is so supported that its lower end will be about one inch above the bottom of the retort. Each glass tube is connected by a pipe of flexible tube $d'$ with a metal pipe $f$, and these latter communicate with a compressed-air receiver B by way of the main pipe $g$, which is provided with a pressure-gage $g'$. It is vitally important that there be interposed between the receiver and the retorts means for thoroughly controlling the delivery of air to the retorts.

It is of course important that a receiver be used for the storage of air under high pressures to provide against such contingencies as are liable to occur with air-pumping mechanisms and motive power, as well as to enable the concentrating plant to continue operations during such stoppages of motive power as are customary in all establishments. I have shown a special compressor or air-pump C operated by its own steam-cylinder; but in many cases power may as well be derived from a motor, also relied upon for other purposes.

It will be seen that each pipe $f$ is provided with a cock $h$; but this is really of consequence only for cutting off communication entirely, and should seldom, if ever, be relied upon for graduation.

In the main pipe $g$, near the receiver, I employ a reliable pressure-regulator D of any of the well-known efficient types, and this needs no specific description. For obtaining the best results I have adjusted my regulator, so that regardless of the pressure within the receiver air will be delivered into the distributing-pipes $f$ at a pressure of about five pounds to the inch and in the receiver I range with, say, from fifty pounds downward to about ten pounds.

As a result of my experimenting as to the volume of air injected into the retorts, I deem it undesirable to inject more air than will afford the degree of agitation essential to secure a practically uniform temperature throughout the contents of a retort. However much the air may be heated as a result of compression or from the ordinary temperature of the space traversed by the pipes, it is injected into a more or less highly-heated body of acid within a retort, and its volume is thereby suddenly increased by expansion, and hence if the quantity of air to be injected be not accurately determined and the injection evenly controlled the objects sought by me will be defeated. Even with a pressure-regulator of the best form known to me and with the cocks $h$, I experienced such difficulty in properly controlling the injection of air to the retorts as to prompt me to experiment with many additional means, and finally in finding a device which I have used with highly-satisfactory results. Between each cock $h$ and connected glass tube I introduce a metal diaphragm $i$, as shown in Fig. 6, which is provided with a single central perforation. With pressure at from, say, three to five pounds in the pipe $g$, I found that when said perforation was as large as a common pin the quantity of air injected was much too great; but when said hole could be filled by the finest sewing-needle perfectly satisfactory results were obtained.

It is not to be understood that my invention is restricted to dimensions indicated or that other pressures may not be successfully employed, but that results in every way desirable will positively accrue by the use of an apparatus constructed as described and operated under the pressures indicated.

Inasmuch as the agitation of the contents of the retort is what I seek to accomplish, I do not limit my invention to injected air as an agitating medium.

In Fig. 3 I illustrate a desirable stirring contrivance. The pipe $d$ here shown may serve as a pipe or as a mere rod, having wings or arms $d^2$ at its lower end. Instead of being suspended on a rail, as in Figs. 1 and 2, said pipe-rod has a suitable ball $k$ fixed thereto, and which, when occupying a cup-shaped neck on the alembic head, will maintain the stirrer at a proper point above the bottom of the retort.

For imparting motion to the stirrer a small rotating crank-wheel $l$, Fig. 4, is coupled to a reciprocating and vibrating arm $m$, having at its front end a gimbal-joint $n$, containing a clamp which firmly embraces the upper end of the pipe-rod. The arm $m$ at its rear end terminates in a tail-piece $m'$, sliding through a hole in a pivoted guiding-head $m^2$, so that as the crank-wheel is revolved the upper end of the rod is moved in a circular path and the lower end within the retort is correspondingly moved, as much as when a paddle is operated by hand for stirring. The non-rotation of the pipe-rod on its axis enables it to be readily coupled by flexible pipes, as before described, to the air-pipes $f$; but the stirrer may be rotated, if desired, and still be coupled to the air-pipes $f$—as, for instance, as illustrated in Fig. 5, wherein the pipe-rod $d$ is suspended from a wide rail and provided with a bevel-gear $o$, meshed by a driving-gear. In this case the upper end of the pipe-rod $d$ is internally tapered and a felt-clad nozzle $p$ is fitted thereto, and at its rear end the connection with the flexible tube $d'$ is made, so that when the pipe-rod is rotated the nozzle $p$ is stationary and a reasonably tight joint secured by the felt packing without undue friction. When the agitators are organized to operate both with and without injected air, any accident occurring either to the air-injecting devices or to the stirring contrivances need not interfere with the agitation, because both would seldom be crippled at the same time.

With my apparatus I have produced as high concentrations as are ordinarily produced by the intermittent process and with far greater economy, and the loss in time and retorts from breakage has been so slight as to constitute practically unimportant items in the cost of manufacture.

While for obtaining the best results I prefer an apparatus embodying all of the several features of my invention in some of their most desirable and practical forms, approximately desirable results will accrue if any one or more of said features are embodied in apparatus otherwise as heretofore constructed and arranged.

Having thus described my invention, I claim as new and desire to secure by Letters Patent—

1. In an apparatus for concentrating oil of vitriol by continuous process, the combination, substantially as hereinbefore described, of the series of coupled glass retorts and means, substantially as described, for agitating the contents of said retorts when heated and thereby obviating the liability of injury to said retorts by peripheral breakage.

2. In an apparatus for concentrating oil of vitriol by continuous process, the series of glass retorts coupled together, in combination with pipes projecting into said retorts and an air-pump for injecting air through said pipes into the contents of said retorts, substantially as and for the purposes specified.

3. In an apparatus for concentrating oil of vitriol by continuous process, the combination of a series of glass retorts coupled together, pipes extending within said retorts and coupled to an air-receiver, and a pressure-regulator between said receiver and the retorts, substantially as and for the purposes specified.

4. In an apparatus for concentrating oil of vitriol by continuous process, the combination, substantially as hereinbefore described, of the series of coupled retorts, the air-injecting pipes therein coupled by suitable pipes to an air-receiver, the pressure-regulator, and a finely-perforated diaphragm within each of said coupling-pipes between said pressure-regulator and each retort.

RUSSELL S. PENNIMAN.

Witnesses:
CHARLES H. MUNSON,
JAMES H. NEIGHBOUR.